Jan. 12, 1926.  1,569,091
W. P. KEAN
DIGGING MACHINE
Filed August 19, 1925    5 Sheets-Sheet 1
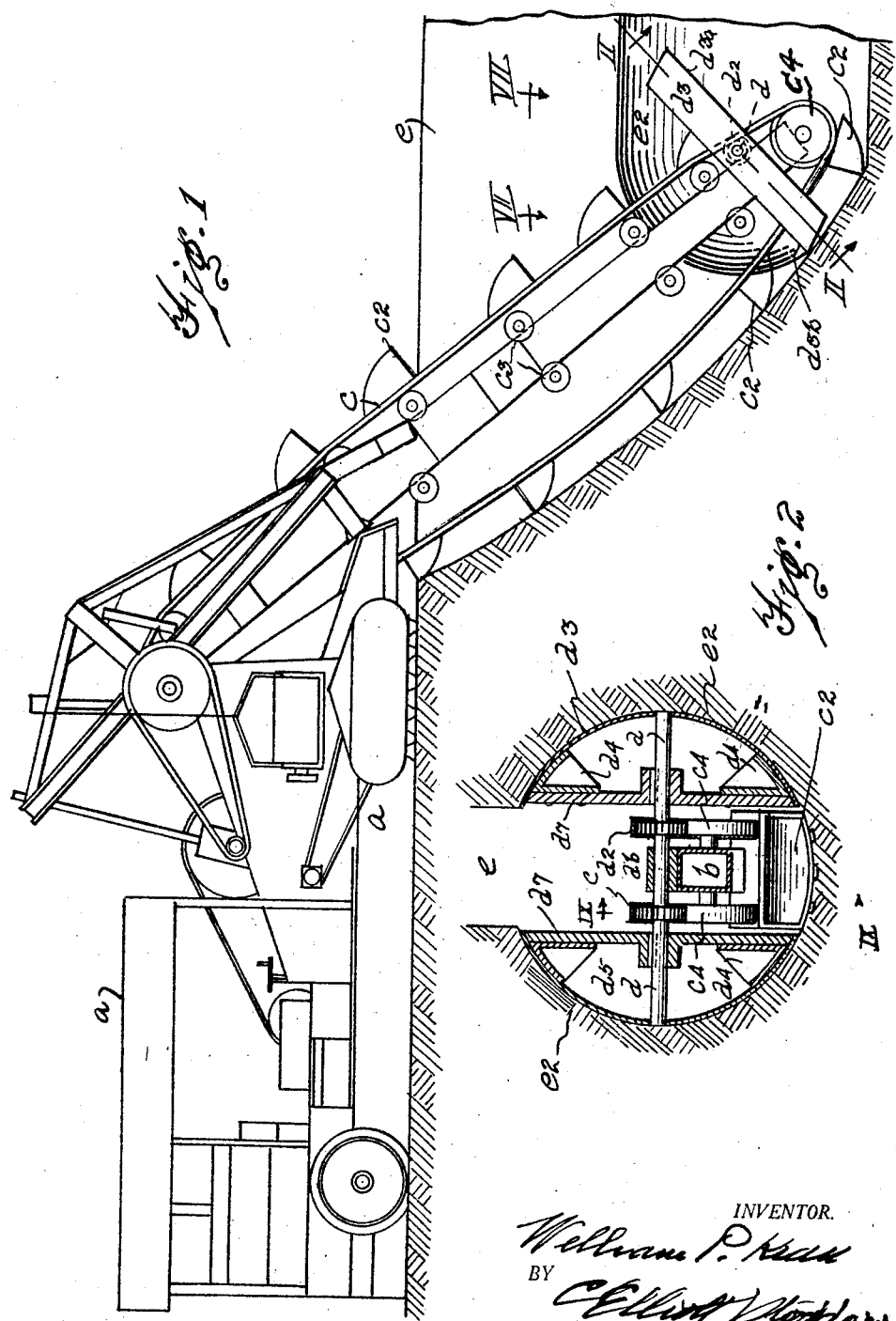
INVENTOR.
William P. Kean
BY
ATTORNEY.

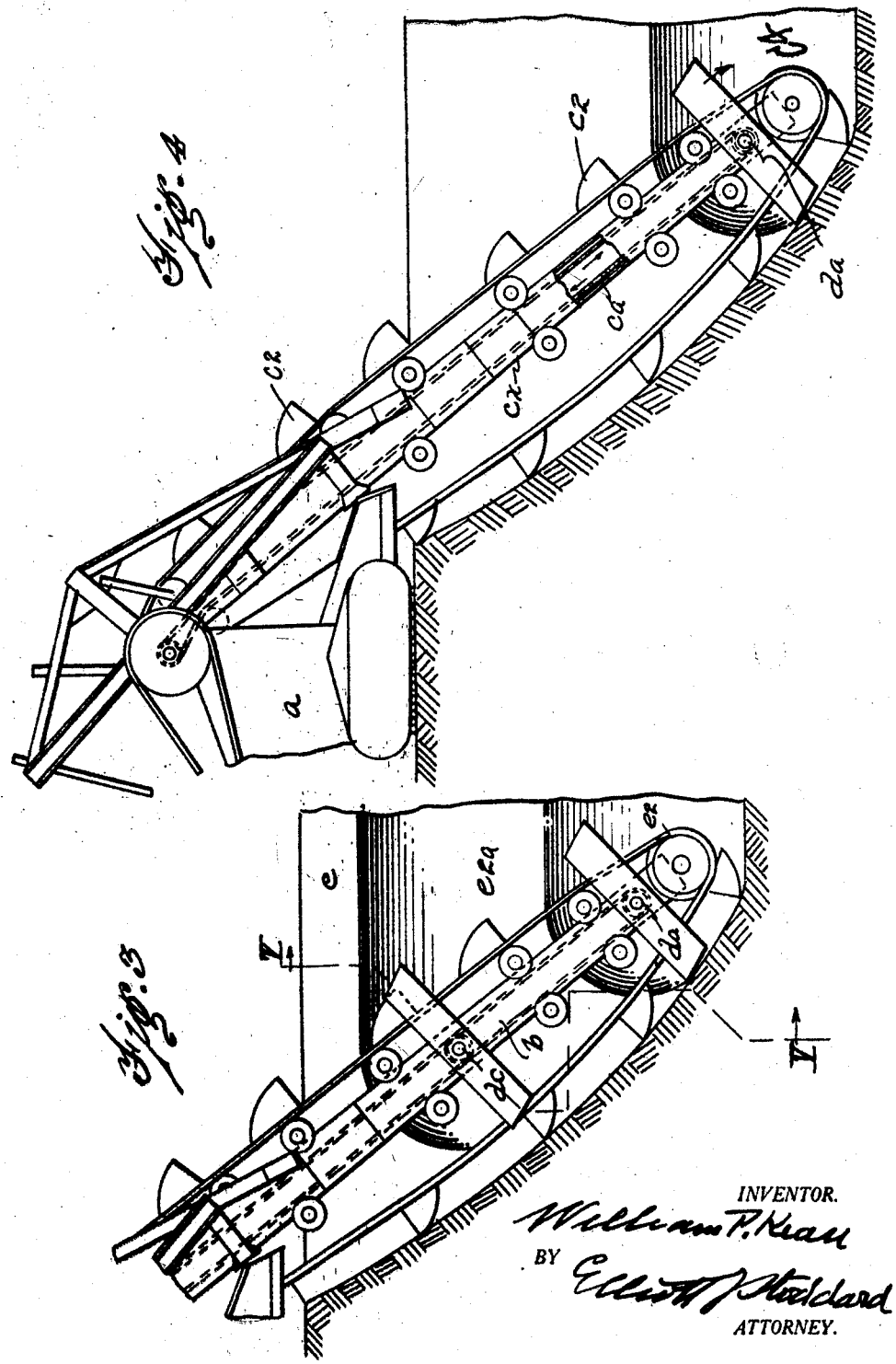

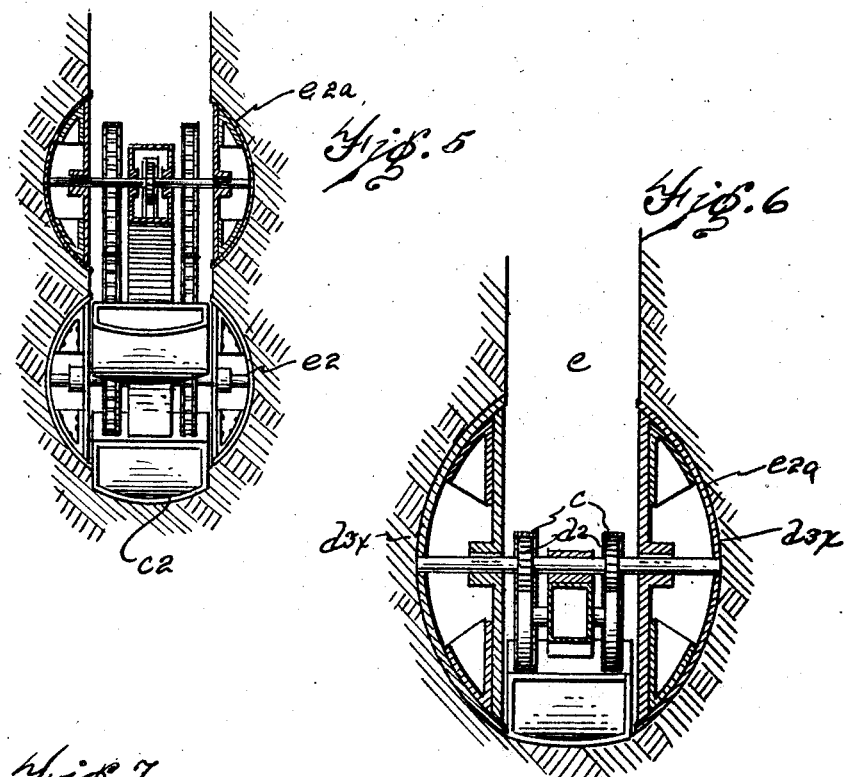

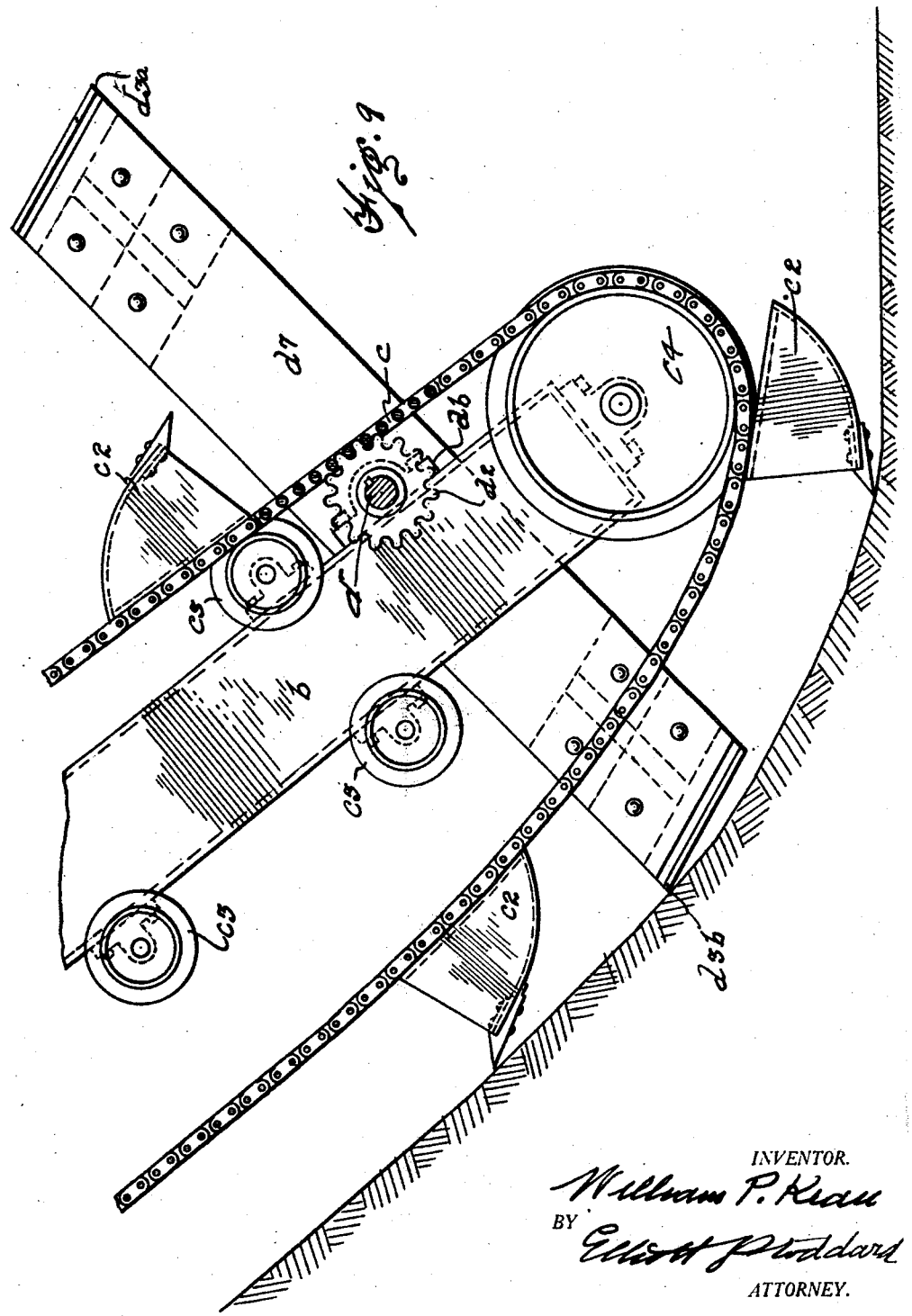

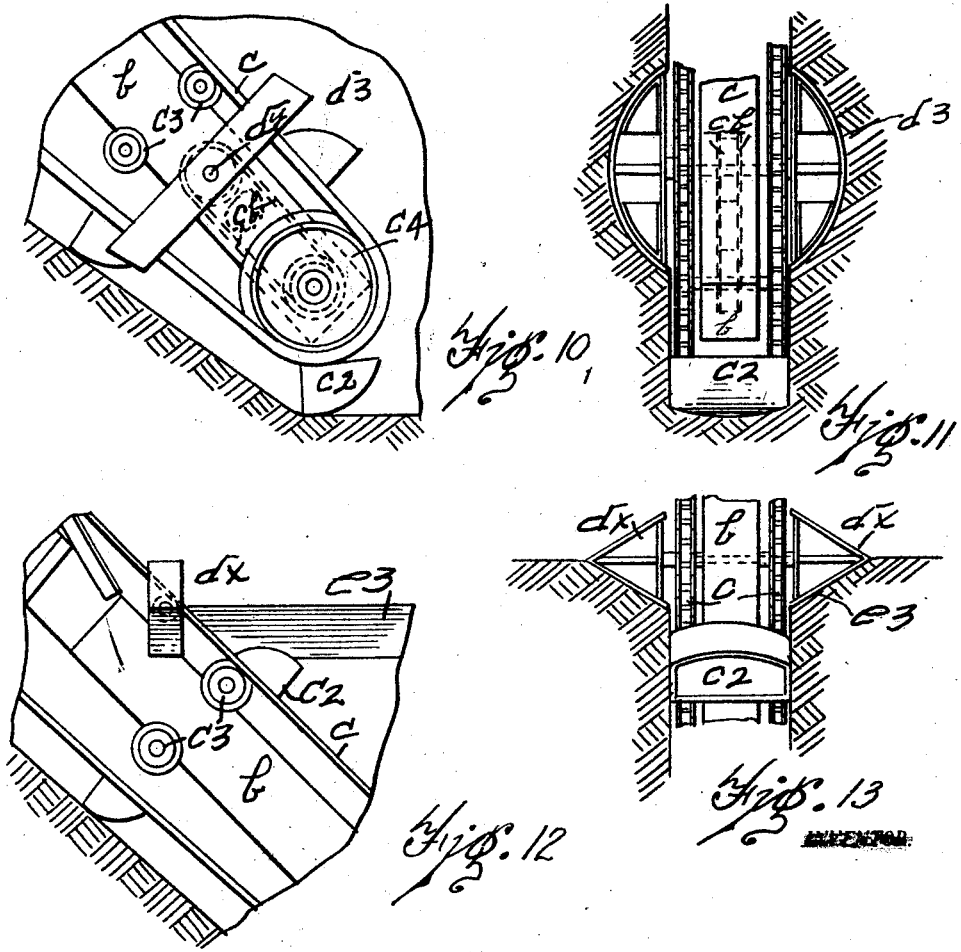

Patented Jan. 12, 1926.

1,569,091

UNITED STATES PATENT OFFICE.

WILLIAM P. KEAN, OF DETROIT, MICHIGAN.

DIGGING MACHINE.

Application filed August 19, 1925. Serial No. 51,237.

*To all whom it may concern:*

Be it known that I, WILLIAM P. KEAN, a citizen of the United States, residing at Detroit, county of Wayne, State of Michigan, have invented a certain new and useful Improvement in Digging Machines, and declare the following to be a full, clear, and exact description of the same, such as will enable others skilled in the art to which it pertains to make and use the same, reference being had to the accompanying drawings, which form a part of this specification.

My invention relates to digging machines and an object of my improvements is to provide for forming a passage of approximately circular cross section especially in connection with a trenching machine.

I secure this object in the device illustrated in the accompanying drawings, in which:

Figure 1, is a side elevation of a trenching machine with an apparatus embodying my invention attached thereto; the adjacent earth being shown in cross section to illustrate the operation of the machine.

Figure 2, is a detail cross section on the line II—II of Figure 1.

Figure 3, is a detail elevation similar to Figure 1 showing a modified construction by which two approximately cylindrical passages are formed at once.

Figure 4, is an elevation similar to Figure 1 showing a modified construction.

Figure 5, is a section on the line V—V of Figure 3.

Figure 6, is a detail section showing a modified form of the tunneling blades and a cross section of the passage formed by said blades.

Figure 7, is a detail plan view of the apparatus toward the outer end of the boom, as shown in Figure 1 looking downward upon the plane VII—VII.

Figure 8, is a perspective view of the cutter blade construction.

Figure 9, is a detail section to an enlarged scale, the section being taken on the line IX of Figure 2.

Figure 10, is a detail elevation of the end of the boom, similar to Figure 9 but to a smaller scale, and showing a modified construction.

Figure 11, is a view looking from the right of Figure 10.

Figure 12, is a view similar to Figure 10, but showing a second modified construction.

Figure 13, is a view from the right of Figure 12.

Referring in the first place to Figure 1, $a$, indicates generally the body of the digger or trenching machine with the power plant and operating apparatus thereon. $b$, is a boom pivoted to the frame of the body $a$ and extending forward therefrom. $c$, is the chain carrying the buckets $c^2$. This chain is guided and carried by friction rollers $c^3$ upon the boom. $c^4$, is the lower boom idler around which the chain $c$ passes and returns to the actuating sprocket wheel upon the body $a$.

It is frequently desirable to cut a passage approximately circular in cross section at the lower end of the cut.

The trench, or normal cut of the machine, is indicated by $e$ and the cylindrical passage by $e^2$.

To cut the approximately circular passage $e^2$, I place a bearing $db$ (Fig. 2) upon the boom $b$ to receive a transverse shaft. $d$, is a transverse shaft resting and adapted to turn in the bearing $db$. This is provided with sprocket wheels $d^2$ which engage the links of the sprocket chain $c$, as shown most distinctly in Figure 9. Upon each end of the shaft $d$, I place an arcuate cutter $d^3$; these cutters have their convex portion outward and are shaped to form the cylindrical passage $e^2$. These cutters are warped to present two cutting edges $d^3a$ and $d^3b$.

$d^7$, is a transverse bar between the ends of the arcuate blade or cutter $d^3$ having a hub at its center which is keyed to the shaft $d$ in position so that the blade shall cut the sides of the passage $e^2$, as shown most distinctly in Figure 2.

The operation of the described device is as follows:

The parts being adjusted, as above described, the buckets $c^2$ cut the trench $e$ in the usual way. The movement of the bucket chain $c$ rotates the shaft $d$ through its links engaging the sprocket wheels $d^2$, $d^2$, upon said shaft, which carries with it the arcuate cutters $d^3$, $d^3$, cutting out the sides and forming the passage tunnel $e^2$ of the circular cross section.

If it is desired to have an elliptical instead of a circular cross section to said passage, the blades are correspondingly formed, as shown in Figure 6, at $d^3x$.

While the above described arrangement is convenient for adjustment to existing trenching machines, if desired, the shaft for the rotating arcuate cutters may be passed transversely through the boom at its center, as shown in Figure 4 at $da$ and a separate driving chain $ca$ may engage a sprocket wheel on the shaft $da$ and pass up to any convenient actuating apparatus upon the frame or body $a$.

It is sometimes desirable to form two passages $e^2$, in which case two shafts $da$ and $db$ (Fig. 3) are adjusted to position on the boom $b$, one above the other so that two passages $e^2$ and $e^2a$ are formed thereby. (Figs. 3 and 5.)

It is sometimes desirable to cut away the sides of the trench at the top to prevent caving in, for this purpose I use a cutter $dx$, Figures 12 and 13 with straight edges arranged at an angle to each other, and placed upon the boom $b$, so that they shall cut away the upper edges of the trench.

A separate shaft $dy$, Figures 10 and 11 may be employed for the cutter and this may be connected with $c^4$ by a separate chain $cb$ and sprocket wheels.

By placing the transverse shaft $d$ for the lateral cutters upon the boom $b$ above the idler $c^4$, cutters $d^3$, much larger than the diameter of the circle in which the outer edges of the buckets $c^2$ move in passing around said idler may be used, and a tunnel of any desired diameter may be formed.

What I claim is:—

1. In a digger, having a boom provided with a conveyor chain and buckets passing over an idler at the lower end of said boom, a shaft extending transversely across, and resting in bearings supported by said boom at a point above said idler, means for rotating said shaft, and arcuate cutters upon the ends of said shaft adapted to cut correspondingly shaped lateral extensions of the trench to form a tunnel.

2. In a digger, having a boom provided with a conveyor chain and buckets passing over an idler at the lower end of said boom, a shaft extending transversely across, and resting in bearings supported by said boom at a point above said idler, means engaging said shaft with said chain so that the shaft shall be rotated by said chain, and arcuate cutters upon the ends of said shaft adapted to cut correspondingly shaped lateral extensions of the trench to form a tunnel.

3. In a digger, the combination of means for forming a trench, and a transverse shaft located at the upper portion of said trench and adapted to be rotated by said digger, said shaft being provided with cutters adapted to cut away the upper edges of the trench.

In testimony whereof, I sign this specification.

WILLIAM P. KEAN.